United States Patent [19]

Johnson, Jr.

[11] 4,166,430

[45] Sep. 4, 1979

[54] FLUID PRESSURE INDICATOR

[75] Inventor: Glenn W. Johnson, Jr., Summit, N.J.

[73] Assignee: Amerace Corporation, New York, N.Y.

[21] Appl. No.: 833,370

[22] Filed: Sep. 14, 1977

[51] Int. Cl.² .............................................. G01L 23/06
[52] U.S. Cl. .................................. 116/202; 92/98 R; 116/266
[58] Field of Search ........... 116/114 PV, 34 R, 114 R, 116/70; 73/406; 92/1, 98 R; 91/1; 137/557; 350/285, 363

[56] References Cited

U.S. PATENT DOCUMENTS

| | | | |
|---|---|---|---|
| 1,969,141 | 8/1934 | McDonald | 73/406 |
| 3,241,514 | 3/1966 | Grimland | 116/114 PV |
| 3,623,448 | 11/1971 | Resh | 116/114 PV |
| 3,834,346 | 9/1974 | Cowan | 116/114 PV |

Primary Examiner—S. Clement Swisher
Assistant Examiner—Denis E. Corr
Attorney, Agent, or Firm—S. Michael Bender; Richard A. Craig

[57] ABSTRACT

Disclosed herein is a fluid pressure indicator for providing visual indication of the magnitude of a fluid pressure condition. The indicator comprises an optical element including a front surface for receiving ambient light and a rear, light-reflecting portion having three mutually perpendicular surfaces which define a cube corner having an apex remote from the front surface, and a one-piece, resilient, imperforate diaphragm in cooperative relationship with the rear, light-reflecting portion of the optical element, to provide a chamber between the interior of the diaphragm and the three perpendicular surfaces. The diaphragm is normally not in optical engagement with the three perpendicular surfaces, but is resiliently deformed into such optical engagement upon the application of a positive fluid pressure differential to the exterior of the diaphragm.

13 Claims, 6 Drawing Figures

U.S. Patent  Sep. 4, 1979  4,166,430
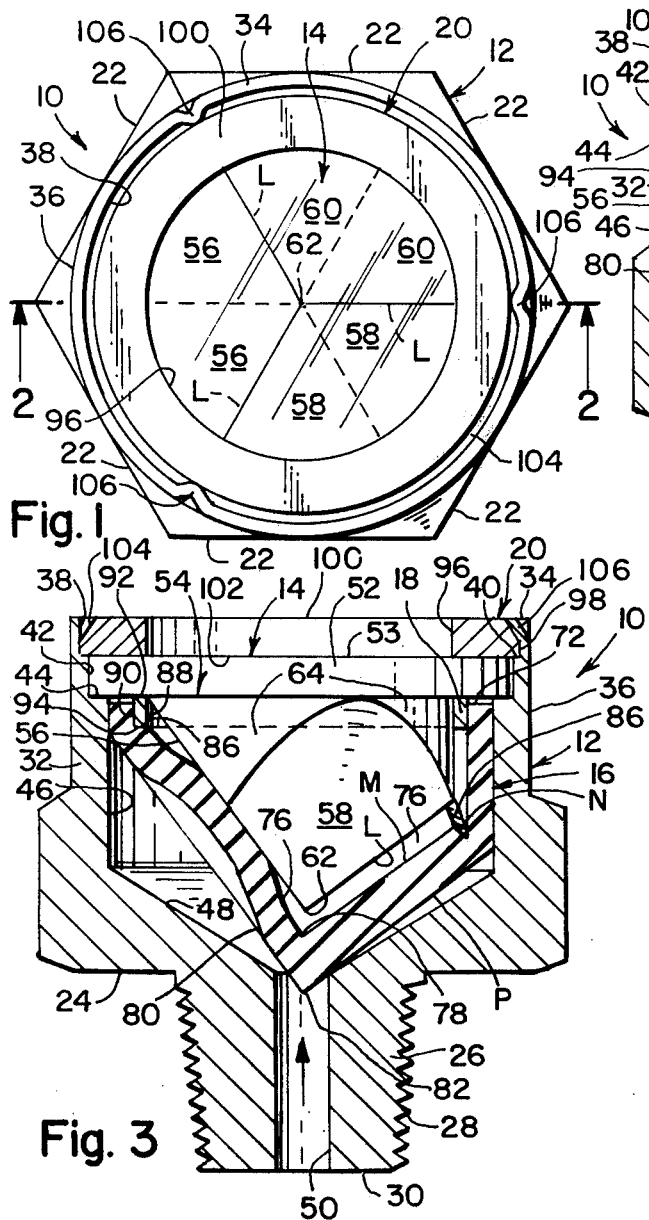
Fig. 1
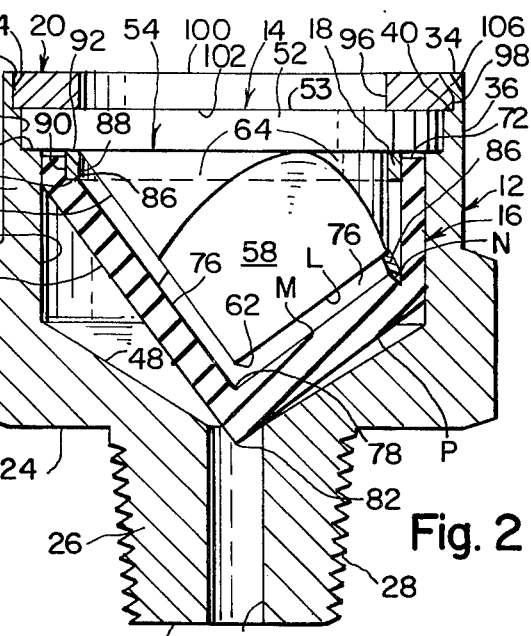
Fig. 2
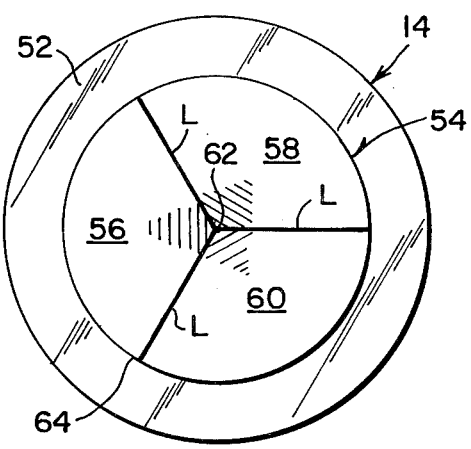
Fig. 4
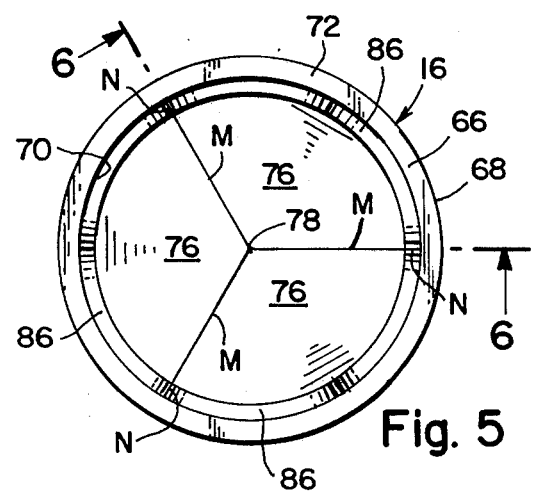
Fig. 3
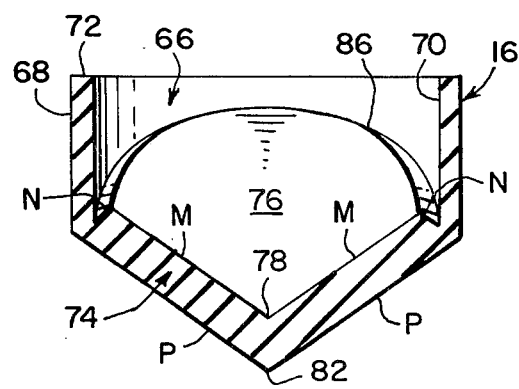
Fig. 5
Fig. 6

FLUID PRESSURE INDICATOR

CROSS REFERENCE TO RELATED APPLICATION

This application is related to copending application Ser. No. 833,369 filed Sept. 14, 1977 in the name of Adam Smorzaniuk and commonly assigned herewith. The relationship between the two applications is brought out hereinafter.

BACKGROUND OF THE INVENTION

This invention relates to a fluid pressure indicator for providing visual indication of the magnitude of a fluid pressure condition, as of fluid, such as air, in a fluid line.

The prior art teaches various types of fluid pressure indicators, such as that of Resh U.S. Pat. No. 3,623,448, issued Nov. 30, 1971 and that of Cowan U.S. Pat. No. 3,834,346, issued Sept. 10, 1974.

The Resh patent discloses a mechanical two-position panel indicator which has a ball which is movable between two positions in which it displays either of two colors throughout the viewing area. The ball is directly positioned by a toggle overcenter spring system which is under the influence of a double acting fluidic pressure operated device. The ball will either remain in the position to which it is last moved by the overcenter system or, by an adjustment means, can be set to remain in either position except when held in the other position by the overcenter system. The Resh indicator involves complex mechanism.

The Cowan patent discloses a device for providing an indication of the condition of a pressurized fluid circuit. The device includes a closed fluid receiving chamber and a sheet of compressible material in the chamber and provided with an aperture. The sheet of compressible material is exposed to view through a clear flat lens which overlies the sheet. The device also includes fluid inlet means in open communication with the chamber. Pressurized fluid is admitted to the chamber through the fluid inlet means and the pressure of the fluid compresses the compressible material, thereby dilating the aperture and providing visual indication of the pressure of the fluid. It is stated, in effect, that the magnitude of the pressure can be judged according to the amount of dilation of the aperture. The compressible material is disclosed as an elastomeric closed cell foam material. The interior of the chamber may have a surface which contrasts in appearance with the compressible material and is visible through the dilated aperture. It has been found that the aperture does not return quickly from its fully dilated to its fully closed condition. Thus, it is possible for the device to indicate for brief periods a pressurized condition when no such condition exists. Also, the closed cell foam material can acquire a permanent set in a dilated condition. Thus, it is possible for the device to provide a permanent false indication of the existence or magnitude of pressure.

There is thus a need for a fluid pressure indicator which is of simple and inexpensive construction, with no moving mechanical parts and which will reliably display a vivid indication of the existence of fluid line pressure of at least a certain minimum magnitude.

There is also a need for a fluid pressure indicator in which the size of the displayed vivid visual indication continuously increases as the fluid line pressure increases from said certain minimum magnitude up to a certain maximum magnitude.

There is a further need for a fluid pressure indicator in which the size of the displayed vivid visual indication instantaneously and reliably changes with changes in the magnitude of the fluid pressure, over an indefinite number of cycles of operation.

There is yet an additional need for such a fluid pressure indicator in which the vivid visual indication instaneously disappears altogether when the magnitude of the fluid pressure drops below the certain minimum magnitude, over an indefinite number of cycles of operation.

There is still a further need for such a fluid pressure indicator the response of which is constant, over an indefinite number of cycles of operation.

Important objects of the present invention are to provide a fluid pressure indicator which fills all of the foregoing needs.

SUMMARY OF THE INVENTION

The inventive fluid pressure indicator provides visual indication of the magnitude of a fluid pressure condition, as of fluid, such as air, in a fluid line.

Broadly, the inventive indicator comprises a transparent, clear optical element and a resilient diaphragm.

The optical element includes a front surface for receiving ambient light and a rear, light-reflecting portion having three mutually perpendicular plane surfaces defining a cube corner having an apex remote from the front surface and an axis preferably substantially perpendicular to the front surface.

The resilient diaphragm is in cooperative relationship with the rear, light-reflecting portion of the optical element to provide a chamber between the interior of the diaphragm and the three mutually perpendicular plane surfaces of the optical element. The diaphragm has three preferably brightly pigmented internal surfaces which confront and are normally not in optical engagement with the three mutually perpendicular plane surfaces of the optical element but are resiliently deformable into such optical engagement upon the application of a positive fluid pressure differential to the exterior of the diaphragm.

The optical element and the diaphragm are located within a body which has means for attachment to a fluid line in fluid tight relationship therewith and an aperture in open communication with the exterior of the diaphragm and adapted for open communication with the fluid line. The chamber is sealed against ingress of fluid from the aperture.

When viewed through the light-receiving surface, and with the indicator in its normal or zero pressure differential conditition, due to the total internal reflection, one sees the optical element as though there was no diaphragm behind it and there is no color to what is seen.

As the fluid pressure in the line assumes a positive value, a positive fluid pressure differential is created between the outside of the diaphragm and the chamber, deforming the diaphragm inwardly in its weakest locations, namely, those including the central portions of the internal diaphragm surfaces which confront the three mutually perpendicular surfaces of the optical element, until those central portions optically engage corresponding central portions of the three mutually perpendicular surfaces of the optical element, over substantial but limited areas. In this condition, light is no longer totally internally reflected in the limited areas of optical engagement, but is reflected by the preferably pigmented diaphragm surfaces, assuming the color of those surfaces and the indicator will be seen to display that color.

As the fluid pressure differential increases still further, deformation of the diaphragm increases, increasing the size of the areas of optical engagement, radiating outwardly from the central areas of initial optical engagement, so that the pigmented or colored area displayed by the indicator increases as the fluid pressure differential increases.

It will thus be seen that an indicator according to the invention provides a positive visual indication when the pressure of fluid in a line exceeds a minimum predetermined value and gives some idea of the value of the pressure in excess of the minimum value, up to a maximum value, beyond which further pressure increase will not cause any change in the signal displayed by the indicator.

DESCRIPTION OF THE DRAWING

FIG. 1 is a top plan view of a preferred fluid pressure indicator embodying the invention, the indicator including a body, an optical element, a diaphragm, a sealing ring and a securing ring;

FIG. 2 is a view on line 2—2 of FIG. 1, showing the indicator in a normal or first fluid pressure condition;

FIG. 3 is a view similar to FIG. 2, but showing the indicator in a second fluid pressure condition;

FIG. 4 is a bottom plan view of the optical element;

FIG. 5 is a top plan view of the diaphragm; and

FIG. 6 is a view on line 6—6 of FIG. 5.

DESCRIPTION OF THE INVENTION

The drawing illustrates a preferred fluid pressure indicator 10 embodying the invention. Indicator 10 comprises an assembly of a body 12 (FIGS. 1, 2 and 3), an optical element 14 (FIGS. 1, 2, 3 and 4), a resilient diaphragm 16 (FIGS. 2, 3, 5 and 6), a sealing ring 18 (FIGS. 2 and 3) and a securing ring 20 (FIGS. 2 and 3).

Body 12 may be machined from hexagonal brass rod, ⅞ inch across-the-flats, the hexagonal configuration providing body 12, when finished, with external hexagonal wrenching surfaces 22 defining a body axis. At one axial end of wrenching surfaces 22, body 12 has a work clamping face 24 perpendicular to and surrounding the body axis. Axially protruding from work clamping face 24 is a shank 26 about 0.362 inch long and provided with an external ⅛ NPT tapered pipe thread 28. The end of shank 26 remote from wrenching surfaces 22 is provided with an annular surface perpendicular to the axis and defining a first axial end 30 of body 12. Body 12 is adapted to be rotated, by wrenching torque applied to wrenching surfaces 22, so that thread 28 goes into screw threaded, fluid tight engagement with a mating internal tapered pipe thread in a T-connection (not shown) in a fluid line (not shown) or in the end of a fluid line (not shown), in the latter instance with shank 26 extending through a hole in a panel (not shown), thus to mount body 12, and hence indicator 10 as well, on the panel with the panel clamped between work clamping face 24 and the fluid line. In what follows, it will be assumed, without limitation, that air is the fluid.

Body 12 also includes an imperforate annular wall 32 extending axially from the axial end of wrenching surfaces 22 remote from clamping face 24. The axial end of wall 32 remote from wrenching surfaces 22 defines a second end 34 of body 12. The distance from end 30 to end 34 is about an inch and the axial extent of wrenching surfaces 22 above work clamping face 24 is about 5/16 inch.

Wall 32 has an external cylindrical surface 36 coaxial with the body axis and about ⅞ inch in diameter.

Coaxial with external surface 36 and extending from end 34 toward end 30 a distance of about 0.075 inch is an internal cylindrical surface 38 about 0.718 inch in diameter terminating in an annular shoulder 40 perpendicular to and completely surrounding the body axis.

Coaxial with surface 38 and extending from shoulder 40 toward end 30 a distance of about 0.065 inch is an internal cylindrical surface 42 about 0.680 inch in diameter and terminating in an annular shoulder 44 perpendicular to and completely surrounding the body axis.

Coaxial with surface 42 and extending from shoulder 44 toward end 30 a distance of about 0.335 inch is an internal cylindrical surface 46 about 0.625 inch in diameter. Surface 46 may be formed by a 0.625 inch drill with a standard 118° drill point, so as to produce a 118° conical surface 48 extending toward end 30 from the axial end of surface 46 remote from end 34.

Finally, body 12 has an internal cylindrical surface or bore 50 coaxial with conical surface 48 and extending from end 30 to surface 48, and providing an aperture in open communication with both end 30 and surface 48.

The depth of the circle of intersection of surfaces 46 and 48 from end 34 is about 0.475 inch and the axial distance from end 34 to clamping face 24 is about 0.625 inch. Also, the axial distance between the circle of intersection of surfaces 46 and 48 and the circle of intersection of surfaces 48 and 50 is about 0.159 inch.

Optical element 14 is transparent and may be molded of clear methyl methacrylate, is preferably of one-piece construction, and has a solid cylindrical portion 52, providing element 14 with a plane front, light-receiving surface 53 perpendicular to the axis of portion 52. Coaxial with portion 52 and immediately therebeneath, optical element 14 has a rear light-reflecting portion 54 providing element 14 with a single cube corner having three like plane faces 56, 58 and 60 adjacent ones of which intersect each other at right angles on lines L and which meet at a cube corner apex 62 at the axial end of element 14 remote from surface 53. The axis of the cube corner coincides with the axis of cylindrical portion 52.

When optical element 14 is viewed from the top, as seen in FIG. 1, due to total internal reflection, an image of each line L is also seen in the form of a linear continuation thereof, as indicated in phantom in FIG. 1.

It will be noted that element 14 also has a cylindrical surface 64 which is coaxial with the cube corner and with cylindrical portion 52. Only three segments of cylindrical surface 64 are actually present, since it is interrupted by faces 56, 58 and 60.

More particularly, the diameter of cylindrical portion 52 is about 0.675 inch, its axial thickness is about 0.062 inch, and the diameter of cylindrical surface 64, and the circle defined by the ends of lines L remote from cube corner apex 62, is about 0.500 inch.

The angle between the cube corner axis and each face 56, 58 and 60 is nominally 35°16′ and the angle between the cube corner axis and each line L is nominally 54°44′.

Diaphragm 16 is of one-piece imperforate construction and suitably may be molded of a silicone rubber compound. For reasons which will appear, diaphragm 16 has a bright pigment, such as red, orange or green, which may be incorporated in the molding compound.

The modulus of elasticity of diaphragm 16 may be on the order of Shore A 20–80.

Diaphragm 16, which is generally cup-shaped, has an upper portion, indicated generally at 66 in FIG. 6, having coaxial external and internal cylindrical surfaces 68 and 70, respectively, joined by an annular surface 72 perpendicular to surfaces 68 and 70 and forming a first axial end of diaphragm 16. Surfaces 68 and 70 define a diaphragm axis. As molded, the diameter of surface 70 is about 0.562 inch and the diameter of surface 68 is about 0.612 inch. Thus, the wall thickness of upper portion 66 is about 0.025 inch.

Diaphragm 16 also has a lower portion, indicated generally at 74 in FIG. 6, having three like internal surfaces 76 which are normally plane and mutually intersect at right angles in lines M and meet at a point 78 on the diaphragm axis Internal surfaces 76 are shaped and dimensioned the same as faces 56, 58 and 60 of optical element 14. Thus, the ends of lines M remote from point 78 define a circle having a diameter of about 0.500 inch, the same as the diameter of the circle defined by the ends of lines L remote from cube corner apex 62. Lower portion 74 also has three like external surfaces 80 which are normally plane and mutually intersect at right angles in lines P and meet at a point 82 on the diaphragm axis and forming a second axial end of diaphragm 16. Each surface 80 is normally parallel to and spaced about 0.050 inch from an associated surface 76.

The axial distance from surface 72 to point 82 is normally about 0.525 inch.

Stepped inwardly from surface 70 and associated with each surface 76 is a lobed, upwardly facing shelf or ramp 86, there being three like shelves 86, each symmetrical with respect to an axial plane perpendicular to its associated surface 76. The inner edge of each shelf 86 provides the upper edge of its associated surface 76 and joins the end of one line M remote from point 78 with the end of a circumferentially adjacent line M remote from point 78. The outer edge of each shelf 86 lies in surface 70 and joins the end of one line N which lies in surface 70 with the end of a circumferentially adjacent line N which lies in surface 70. The highest points of shelves 86 lie in a plane parallel to surface 72 and spaced about 0.050 inch therebelow.

Sealing ring, 18 which may be brass, has inner and outer coaxial cylindrical surfaces 88 and 90, respectively, and upper and lower plane parallel surfaces 92 and 94, respectively, perpendicular to the axis of ring 18. The diameter of surface 88 is about 0.500 inch and the diameter of surface 90 is about 0.575 inch. The distance from surface 92 to surface 94 is about 0.062 inch.

Securing ring 20, which may be brass, has inner and outer coaxial cylindrical surfaces 96 and 98, respectively, and upper and lower plane parallel surfaces 100 and 102, respectively, perpendicular to the axis of ring 20. The diameter of surface 96 is about 0.500 inch and the diameter of surface 98 is about 0.715 inch. The distance from surface 100 to surface 102 is about 0.062 inch. Joining outer surface 98 and upper surface 100 is a conical surface 104 which makes an angle of about 30° with the axis of ring 20 and which intersects outer surface 98 in a circle located about 0.015 inch above surface 102.

The manner of assembly of body 12, optical element 14, diaphragm 16, sealing ring 18 and securing ring 20 will now be described.

First, diaphragm 16 and sealing ring 18 are assembled with each other. This is accomplished by inserting ring 18 within upper portion 66 of diaphragm 16, until lower surface 94 of ring 18 engages the highest points of all ramps 86. In this condition, upper portion 66 of diaphragm 16 is slightly resiliently expanded, so that the diameter of surface 70 (normally about 0.562 inch) is expanded to the diameter of ring surface 90 (about 0.575 inch), so that surface 70 sealingly engages surface 90, and the diameter of surface 68 is expanded to about 0.626 inch, slightly greater than the diameter of body surface 46. Also, it is noted that ring surface 92 is located slightly above (about 0.012 inch) diaphragm surface 72.

Next, the sub-assembly of diaphragm 16 and sealing ring 18 is placed in body 12, with diaphragm point 82 entering end 34 of body 12, until point 82 is within bore 50 and lines P engage the upper end thereof. In this condition, point 82 is located about 0.03 inch below the circle of intersection of conical surface 48 and bore 50. Also in this condition, upper surface 92 of sealing ring 18 is substantially coplanar with annular surface 44 of body 12, and diaphragm surface 68 sealing engages body surface 46. The significance of this last fact will be brought out.

Next, optical element 14 is placed, cube corner apex 62 first, into end 34 of body 12, until upper cylindrical portion 52 is within internal cylindrical surface 42 and rests on annular shoulder 44. As noted above, the diameter of surface 42 is about 0.680 inch and the diameter of cylindrical portion 52 is about 0.675 inch, thus allowing cylindrical portion 52 52 to fit freely within surface 42. As further noted above, the axial length of surface 42 is about 0.680 inch and the axial thickness of portion 52 is about 0.062 inch, thus allowing portion 52 to be completely within surface 42 and providing an axial clearance between portion 52 and the plane of annular shoulder 40.

Finally, securing ring 20 is inserted, surface 102 first, into end 34 of body 12, so that surface 102 rests on annular shoulder 40 and outer cylindrical surface 98 confronts internal cylindrical surface 38 of body 12. As noted above, the diameter of surface 98 is about 0.715 inch, the diameter of surface 38 is about 0.718 inch and the axial extent of surface 38 is about 0.075 inch and the axial thickness of securing ring 20, that is, the distance from surface 100 to 102, is about 0.062 inch.

The assembly of indicator 10 is completed, and the parts thus held together, by inwardly deforming wall 32 into overlapping engagement with conical surface 104 of ring 20, at the axial location of internal surface 38, as by staking at three equi-spaced locations as shown at 106. Alternatively, such inward deformation of wall 32 may be throughout the entire circumference thereof. Since the axial extent of surface 42 is slightly greater than the thickness of upper solid cylindrical portion 52 (0.065 inch compared with 0.062 inch), there is no danger that the deforming operation will crack or otherwise damage optical element 14.

Securing ring 20 performs the additional function of effectively hiding diaphragm surface 72 from view, thus preventing indicator 10 from giving a false or misleading signal.

When the parts are in assembled condition, each of cube corner faces 56, 58 and 60 confronts and is nominally spaced from and generally parallel to a different one of internal surfaces 76 of diaphragm 16, the space between optical element 14 and diaphragm 16 constituting a chamber which is not truly fluid-tight, there being only minimal constraint against egress of fluid from the chamber. Thus, there is a positive seal, as stated above, between diaphragm 16 and sealing ring 18 and a positive seal between diaphragm surface 68 and body surface 46, but fluid can escape quite readily along a path from the chamber to the atmosphere by passing between optical element 14 and sealing ring 18 and thence past annular diaphragm edge surface 72 and thence between optical element 14 and body 12 and thence past securing ring 20. Also, fluid can quite readily reenter chamber from the atmosphere in reverse fashion. However, the seal between diaphragm surface 68 and body surface 46 is significant, for this seal prevents fluid pressure from the fluid line from finding its way into the sealed chamber.

The spacing between each of cube corner faces 56, 58 and 60 and its associated diaphragm surface 76 is about 0.036 inch and the axial distance between cube corner apex 62 and point 78 is about 0.062 inch.

It does not matter whether or not each of cube corner faces 56, 58 and 60 is precisely parallel to its associated diaphragm surface 76. In fact, there can be slight, that is, line contact without significantly altering the operation of indicator 10.

In operation, when there is no pressure in the fluid line, that is, when the pressure exerted on external diaphragm surfaces 80 is the same as that within the chamber, diaphragm 16 will be in its undeformed or normal condition, as shown in FIG. 2, with internal diaphragm surfaces 76 spaced from, that is, not in optical engagement with, cube corner surfaces 56, 58 and 60.

Except where otherwise specified, all dimensions given for diaphragm 16 and all dimensions relating diaphragm 16 to other elements of indicator 10 are given with respect to diaphragm 16 in its undeformed condition.

When viewed through front surface 53, and with indicator 10 in its normal or zero pressure differential condition, due to total internal reflection of light entering optical element 14 through light-receiving surface 53, one sees optical element 14 as though there were no diaphragm 16 behind it. There is no color to what is seen.

As the fluid pressure in the fluid line assumes a positive value, as indicated by the arrow in bore 50 in FIG. 3, a positive fluid pressure differential is created between the outside of diaphragm 16 and the chamber between diaphragm 16 and optical element 14, forcing fluid from the chamber along the previously noted path and deforming the wall of diaphragm 16 inwardly in its weakest locations, namely, those including the central portions of internal surfaces 76, until those central portions optically engage corresponding central portions of cube corner faces 56, 58 and 60, over substantial but limited areas, as shown in FIG. 3.

In this condition, and when viewed from the top, light is no longer totally internally reflected in the limited areas of optical engagement, but is reflected in those areas by the pigmented diaphragm surfaces 76, assuming the color thereof and indicator 10 will be seen to display the color of the bright pigment of diaphragm 16, in limited areas.

As the fluid pressure differential increases still further, more fluid is forced from the chamber and the deformation of diaphragm 16, is increased thus producing a larger and larger area of optical engagement of diaphragm surface 76 and cube corner faces 56, 58 and 60, radiating outwardly from the central locations of initial optical engagement, so that the pigmented or colored area displayed by indicator 10 increases as the fluid pressure differential increases.

When the fluid pressure differential is removed, almost instantaneously, fluid is drawn into the chamber along the reverse of the previously-noted path and diaphragm 16 returns to its normal condition as shown in FIG. 2.

The herein disclosed embodiment of the invention displays its colored signal of minimum area with a fluid pressure differential of about 5 psi and displays its colored signal of maximum area with a fluid pressure differential of about 45 psi.

Thus, indicator 10 provides visual indication of whether or not fluid pressure is present within the fluid line, and, if so, some idea of the magnitude of that pressure.

If indicator 10 is viewed through front surface 53 at an observation angle sufficiently large with respect to the cube corner axis, with indicator 10 in the zero pressure condition, optical element 14 may appear to have assumed the color of the pigment of diaphragm 16, thus creating a false signal. The observation angle beyond which indicator 10 gives such a false signal may be increased by making optical element 14 of a material having a higher index of refraction than methyl methacrylate, the index of refraction of which is about 1.49. Examples of other suitable materials for optical element 14 are polycarbonate (the index of refraction of which is about 1.59), polysulfone (the index of refraction of which is about 1.633), polyether sulfone (the index of refraction of which is about 1.65) and glass (the index of refraction of a suitable type of which is about 2.00).

It will be apparent that indicator 10 is well adapted to the attainment of the stated objects and others.

To revert to the relationship between this application and the aforementioned Smorzaniuk U.S. application Ser. No. 833,369, it is noted that the two applications disclose a single embodiment.

Prior to Mr. Smorzaniuk's involvement in the project, the present applicant had the concept of an indicator comprising a transparent cover with a cube corner pattern on the back, a molded rubber diaphragm conforming closely to the cube corner pattern, but normally spaced away from the facets of the cube corner and a back cover piece forming an air chamber around each cube when assembled and clamped to the transparent cover, sandwiching the diaphragm between the two. According to the present applicant's concept, the tip of the cube corner was truncated and the diaphragm at all times engaged the truncated tip of the cube. The present applicant believed that the truncation was desirable to avoid the possibility that a sharp cube corner tip would rupture the diaphragm.

Mr. Smorzaniuk was thereupon given the task of working out a specific embodiment. This Mr. Smorzaniuk did, the result of his work being the embodiment disclosed herein.

The embodiments of the invention in which an exclusive property or privilege is claimed are defined as follows:

1. A fluid pressure indicator for providing visual indication of the magnitude of a fluid pressure condition, said indicator comprising a transparent, clear optical element including a first surface for receiving ambient light and a rear, light reflecting portion having three mutually perpendicular plane surfaces defining a cube corner having an apex remote from said front surface and a cube corner axis, and a resilient, imperforate diaphragm in cooperative relationship with said rear, light reflecting portion to provide a chamber between the interior of said diaphragm and said plane surfaces, said diaphragm having three internal surfaces, each confronting but normally not in optical engagement with a different one of said plane surfaces, but resiliently deformable into such optical engagement upon the application of a positive fluid pressure differential to the exterior of said diaphragm.

2. The invention of claim 1 wherein said indicator further includes a body having means for attachment to a fluid line in fluid tight relationship therewith and an aperture in open communication with the exterior of said diaphragm and adapted for open communication with said fluid line, the exterior of said diaphragm being in fluid sealed relationship with said body to prevent ingress of fluid from said aperture into said chamber.

3. The invention of claim 1 wherein said diaphragm is molded rubber.

4. The invention of claim 1 wherein the front surface of said optical element is substantially flat and the cube corner axis is substantially perpendicular to said front surface.

5. The invention of claim 1 wherein increase in the magnitude of the positive pressure differential increases the area of said optical engagement.

6. A fluid pressure indicator for providing visual indication of the magnitude of a fluid pressure condition, said indicator comprising a transparent element of predetermined material, said element having an axis and including a front surface and a rear surface, and a diaphragm confronting but normally not in optical engagement with said rear surface but movable into such optical engagement upon the application of a positive fluid pressure differential to the exterior of said diaphragm, said rear surface related to said axis such that light emanating from outside said element and impinging on said front surface in a direction parallel to said axis and thereafter impinging on said rear surface from within said element will undergo total internal reflection at all portions of said rear surface where said rear surface is not optically engaged by said diaphragm, whereby when said element is viewed through said front surface with said diaphragm not in optical engagement with said rear surface, said total internal reflection of said light at said rear surface renders at least a substantial portion of said diaphragm invisible, but when said diaphragm is moved into an area of such optical engagement, such total internal reflection does not occur in said area and said diaphragm is thereby rendered visible.

7. The invention of claim 6 wherein increase in the magnitude of the positive pressure differential increases the area of said optical engagement.

8. The invention of claim 6 wherein said rear surface makes an acute angle with said axis such that said light emanating from outside said element and impinging on said front surface in a direction parallel to said axis at a first angle of incidence and thereupon leaving said front surface at a predetermined angle with respect to the normal to said front surface and thereafter impinging on said rear surface from within said element will do so at a second angle of incidence which is greater than the critical angle of said material.

9. The invention of claim 6 wherein said diaphragm is opaque.

10. The invention of claim 6 wherein said diaphragm is resilient and self-supportive.

11. The invention of claim 8 wherein said front surface and said rear surface and said axis are so related that the sum of said first angle of incidence and the complement of said acute angle, reduced by said predetermined angle, is greater than said critical angle.

12. The invention of claim 11 wherein said front surface is substantially flat and perpendicular to said axis and said acute angle is such that the complement thereof is greater than said critical angle.

13. The invention of claim 12 wherein said index of refraction is about 1.49 and said acute angle is about 35°16″.

* * * * *